July 9, 1968 J. A. STADLER 3,391,580
NOSEWHEEL STEERING SYSTEM
Filed April 19, 1965 5 Sheets-Sheet 1

INVENTOR.
James A. Stadler
BY
Chenier & O'Connor
ATTORNEYS

July 9, 1968 J. A. STADLER 3,391,580
NOSEWHEEL STEERING SYSTEM
Filed April 19, 1965 5 Sheets-Sheet 3

INVENTOR.
JAMES A. STADLER
BY
Shenier & O'Connor
ATTORNEYS

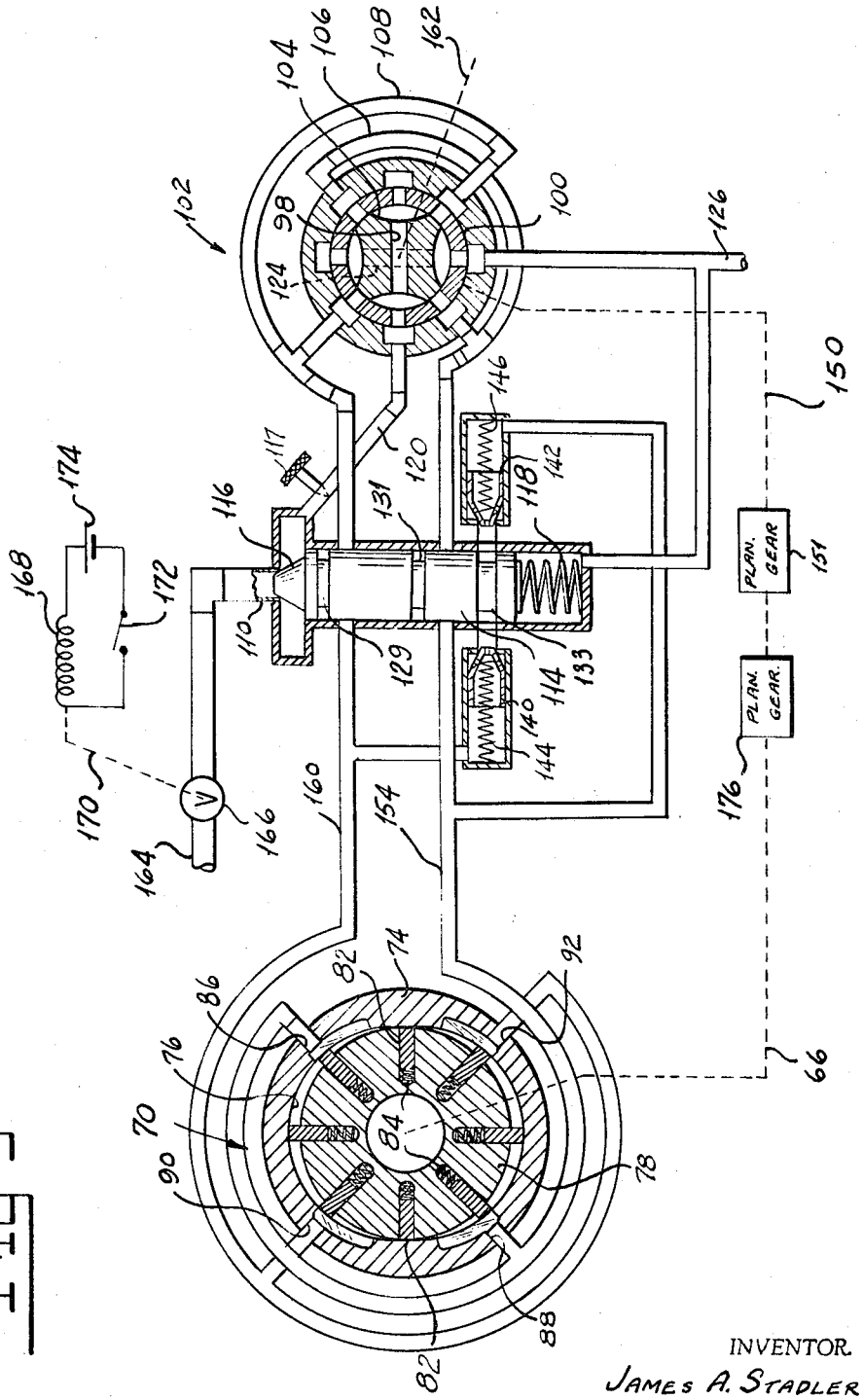

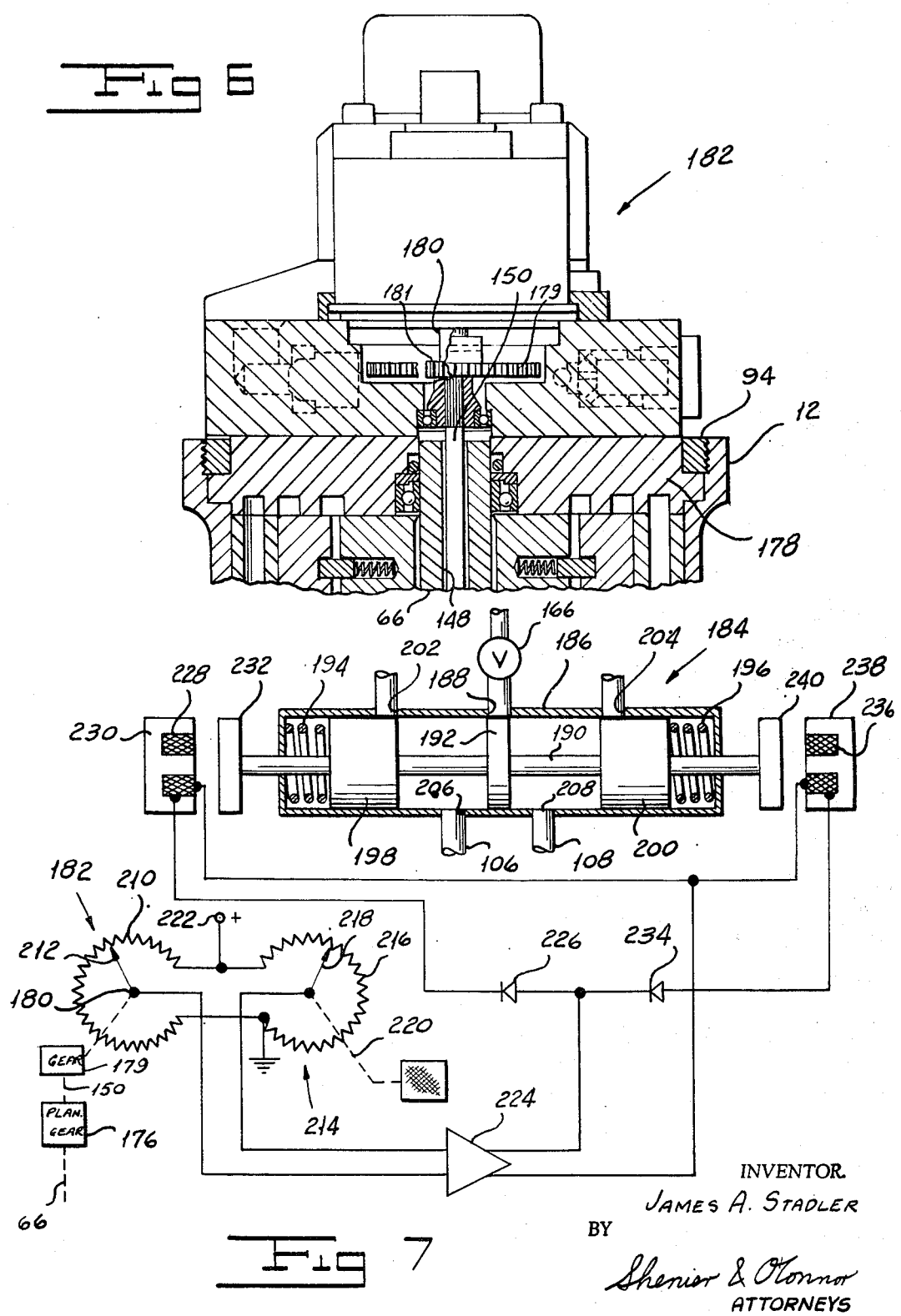

United States Patent Office 3,391,580
Patented July 9, 1968

3,391,580
NOSEWHEEL STEERING SYSTEM
James A. Stadler, Sands Point, N.Y., assignor to Ozone Metal Products Corp., Ozone Park, N.Y., a corporation of New York
Filed Apr. 19, 1965, Ser. No. 448,994
12 Claims. (Cl. 74—388)

ABSTRACT OF THE DISCLOSURE

An improved hydromechanical power and control unit in which a feedback shaft extends from a power transmission unit below a prime mover upwardly through a hollow output shaft of the prime mover to a feedback unit supported on the power and control unit housing above the prime mover.

My invention relates to a nosewheel steering system and more particularly to an improved remotely controlled hydromechanical power unit adapted to deliver a large power output in response to a relatively small input signal.

There are known in the prior art systems for steering the nosewheel of an aircraft in response to a control signal initiated in the aircraft cabin. In general, these systems afford only a limited range of movement of the wheel. They are complex in construction and are cumbersome. Moreover, owing to the disposition of the parts, they are susceptible of damage or even destruction in case of an accident such, for example, as a blowout of the very-high-pressure tire of the nosewheel.

I have invented a simple, compact hydromechanical power unit and control therefor which is especially adapted for use in a nosewheel steering system. My system affords a relatively wide range of movement. It is extremely simple and compact for the result achieved thereby. I so arrange the parts of my device that they are not readily susceptible to damage upon failure of other parts in the environment of the unit.

One object of my invention is to provide an improved hydromechanical power and control unit which is especially adapted for use in a nosewheel steering system.

Another object of my invention is to provide an improved hydromechanical power and control unit which is extremely simple in construction for the result achieved thereby.

A further object of my invention is to provide an improved hydromechanical power and control unit which is compact.

Yet another object of my invention is to provide an improved hydromechanical power and control unit having a gear transmission system which increases the torque applied to the driven member while reducing side thrust on the hydraulic motor.

Still another object of my invention is to provide an improved hydromechanical power and control unit, the disposition of parts of which is such that the parts are not readily subject to damage upon the occurrence of a failure in a part in the environment of the system.

Other and further objects of my invention will appear from the following description.

In general my invention contemplates the provision of an improved hydromechanical power and control unit in which a housing supports a prime mover having a hollow output shaft and a power transmission unit below the prime mover. A feedback shaft extends from the transmission unit through the hollow output shaft to a feedback unit supported on the housing above the prime mover.

In the accompanying drawings which form part of the instant specification and which are to be read in conjunction therewith and in which like reference numerals are used to indicate like parts in the various views:

FIGURE 5 is a schematic view illustrating the operation of the form of my hydromechanical power and control unit shown in FIGURES 2 and 3.

FIGURE 6 is a sectional view of an alternate form of my hydromechanical power and control unit.

FIGURE 7 is a schematic view of my improved hydromechanical power and control unit.

Figure 1:
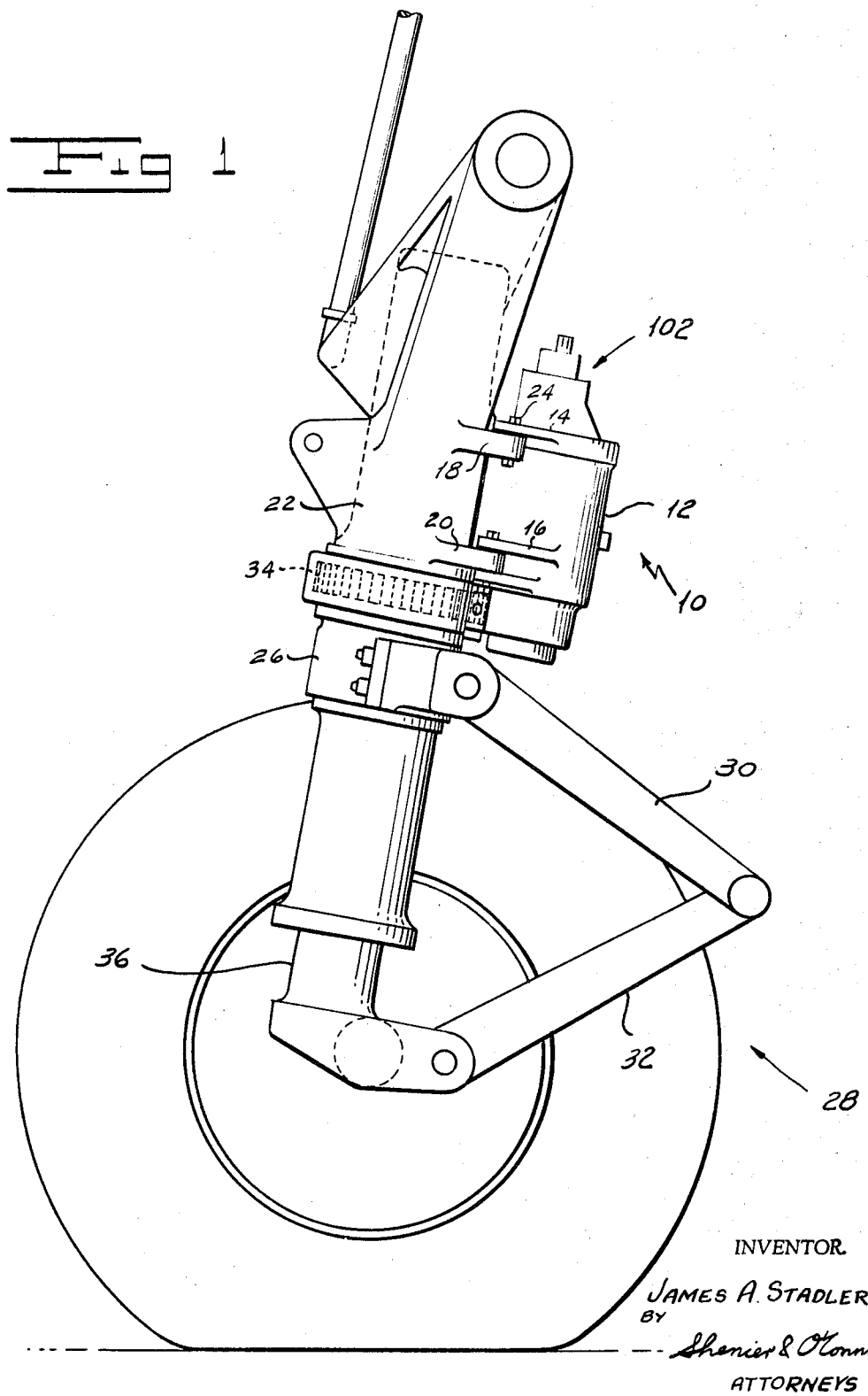
FIGURE 1 is a fragmentary view illustrating the application of my hydromechanical power and control unit to the nosewheel of an aircraft.

Referring now to FIGURES 1 to 4, one form of my improved hydromechanical power and control unit indicated generally by the reference character 10 includes an outer unit housing 12 provided with mounting lugs 14 and 16 which permit the unit to be mounted on the apparatus with which it is housed. For example, in one particular installation for which my unit is eminently suited, I may secure the lugs 14 and 16 to corresponding lugs 18 and 20 on the outer barrel 22 of a nosewheel strut assembly by means of bolts 24 or the like. Below the strut outer barrel I provide a torque collar 26 which is connected to the wheel assembly indicated generally by the reference character 28 by torque links 30 and 32. The torque collar 26 has a peripheral gear 34 adapted to be driven in a manner to be described to rotate the nosewheel assembly carried by the strut under barrel 36 in a manner to be described.

My assembly includes a planet gear carrier 38 disposed adjacent the lower end of the housing 12 and supported for rotary movement by any suitable means such, for example, as bearings 40 and 42. I mount a pinion 44 on planetary gear carrier 38 for rotation therewith. Pinion 44 engages respective gears 46 and 48 carried by idler shafts 50 and 52. It will be appreciated that the carrier 38 constitutes the output shaft of the drive system and that rotary movement of this carrier or shaft 38 is to be transmitted to collar 26 by gears 46 and 48. When the planetary carrier 38 is driven, pinion 44 drives the gears 46 and 48 which mesh with the peripheral gear 34 to turn the torque collar 26, thus to turn the wheel assembly through the torque links 30 and 32. Owing to the fact that I employ two idler gears 46 and 48 spaced circumferentially of element 38 side thrust on the system is reduced. Also, use of a smaller gear 44 increases the torque applied to the ring 26 through the idler gears 46.

Circumferentially spaced idler shafts 54 on the carrier 38 support bearings 56 which receive respective planet gears 58 which engage with a ring gear 60 formed on the inner surface of the housing 12.

Respective spaced bearings 62 and 64 in the housing 12 support a shaft 66 carrying a sun gear 68 which meshes with the planet gears 58. When shaft 66 is driven in a manner to be described, it drives gears 58 around the ring gear 60 thus to rotate the carrier 38.

My unit includes a positive displacement hydraulic motor indicated generally by the reference character 70 which may, for example, be a vane motor. A spacer 72 within the housing 12 locates the motor 70 over the planetary drive system just described. Motor 70 includes an outer shell 74 provided with a central, generally elliptical opening 76 in which the motor rotor 78 moves. As is known in the art, rotor 78 has a plurality of circumferentially spaced, radially extending slots 80 which receive the vanes or blades 82 of the motor. Springs 84 normally urge the vanes 82 radially outwardly into engagement with the surface forming the opening 76. Splines 79 on the rotor 78 are disposed in slots 81 on shaft 66 to provide a driving connection between the motor rotor and the shaft.

By way of example, as shown in FIGURE 5, the motor 70 may be provided with a first pair of inlet ports 86 and 88 to which fluid may be fed to drive rotor 78 in one direction such, for example, as a counterclockwise direction. Another pair of spaced ports 90 and 92 are provided to supply fluid for driving the motor rotor 78 in a clockwise direction.

A retaining ring 94 threaded or otherwise secured into the top of the housing 12 holds a valve housing 96 in position on the unit. I provide the housing 96 with a bore 98 which rotatably receives the feedback sleeve 100 of a rotary servo valve indicated generally by the reference character 102 having a rotor 104. As will be described more fully hereinafter, valve rotor 104 is adapted to be driven from a remote position to deliver fluid to one side or the other of the vane motor 70. For example, the rotor 104 may be positioned to connect a source of fluid under pressure to one passage 106 to drive the motor in one direction and alternatively the rotor 104 may be positioned to connect the source to a second passage 108 to drive the motor in the reverse direction.

A fitting 110 in the housing 96 is adapted to admit fluid under pressure to a second bore 112 in the housing 96 to actuate a bypass valve 114 having a head 116 normally moved into engagement with the fitting by a spring 118. When fluid under pressure is supplied to the fitting 110, it moves the valve 114 downwardly as viewed in FIGURE 2 against the action of spring 118 to supply fluid to a passage 120 connected to inlet ports 122 of the sleeve 100. Sleeve 100 has outlet ports 124 connected to a return passage 126 in the valve block 96. I may provide an adjustable flow restrictor 117 in passage 120.

In the normal position of the valve 114 to which it is urged by spring 118 when no fluid is supplied to the valve 114, passages provided by reduced diameter portions 128 and 130 connect the lines 106 and 108 to flow-restricting or damper valve arrangement indicated generally by the reference character 132 positioned in a third bore 134 by means of a plug 136. The assembly 138 includes orificed elements 140 and 142 normally urged inwardly by springs 144 and 146. With valve 114 in the position to which it is uged by spring 118, element 140 restricts the flow of fluid through the assembly 132 in one direction while element 142 restricts the flow of fluid through the assembly 132 in the reverse direction. I have indicated this condition of the apparatus schematically in FIGURE 5, it being understood that passage 106 of valve 102 is connected to ports 86 and 88 of motor 70 by a line 154 while passage 108 of valve 102 is connected to inlet ports 90 and 92 of motor 70 by a line 160. I have shown reduced diameter portions 129 and 131 in the valve 114 to provide a direct connection between valve 102 and motor 70 when fluid under pressure is supplied to fitting 110. The damper valve connection is indicated schematically by the reference character 133 in this figure. It will be appreciated that when fluid under pressure supplied to fitting 110 moves valve 114 down the passage provided by 133 is blocked, thus to cut off the damper arrangement.

Shaft 66 is secured to rotor 78 for movement therewith so that when fluid is supplied to one side or the other of motor 70 to drive rotor 78, shaft 66 will move the rotor to drive the planet gear 58 to rotate the carrier 38 to drive the torque collar through gears 46 and 48. I provide my system with an extremely simple and effective feedback arrangement for operating the feedback sleeve 100 to reduce the error signal as the torque sleeve approaches the position to which it is to be moved. First, I form the main shaft 66 with an axially extending bore 148.

I mount a feedback shaft 150 on a spider or planet gear carrier 151 for rotation therewith. A sun gear 153 supported on carrier 38 for movement therewith drives planet gears 155 on carrier 151. Planet gears 155 ride on a ring gear 157 supported on the housing. In this manner the rotational speed of feedback shaft 150 is reduced in the same ratio as that from drive pinion 44 to torque collar 34. Thus the ratio of the input angle between control spool 104 and the angle to which the nosewheel is driven by torque collar gear 34 is one-to-one.

Figure 3:
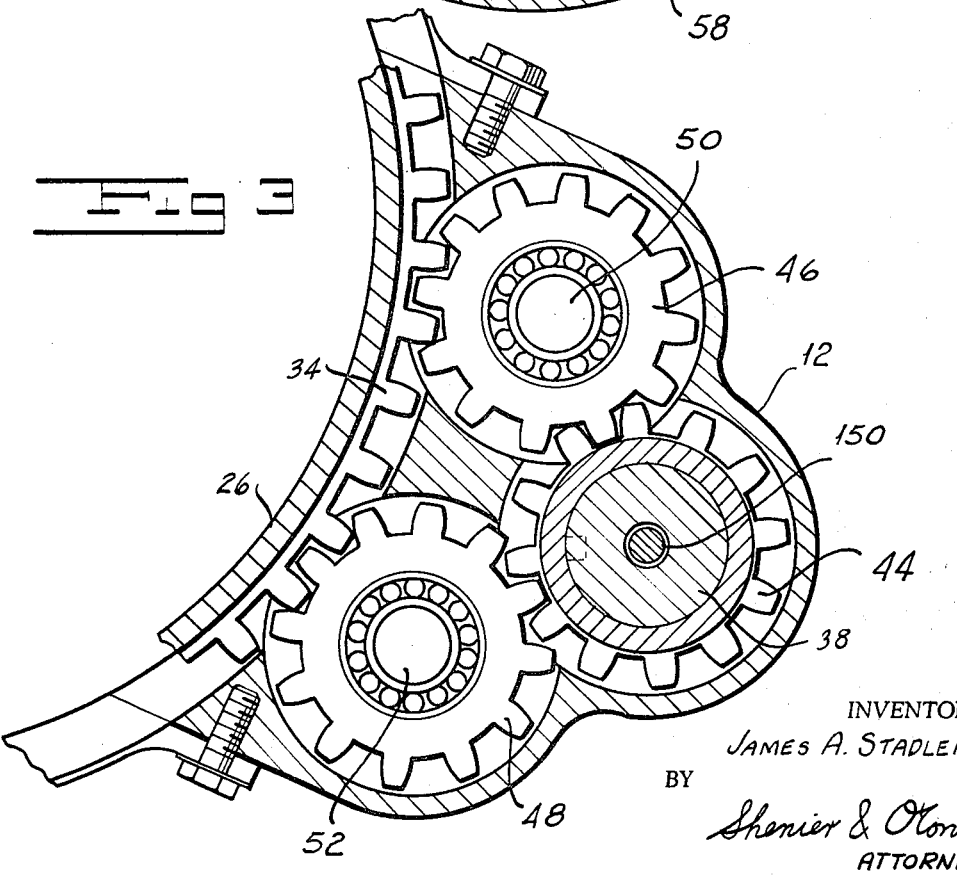
FIGURE 3 is a sectional view of my hydromechanical power and control unit taken along the line 3—3 of FIGURE 2.

The arrangement just described incorporates a number of significant advantages. First, it provides an extremely simple means for transmitting a feedback signal directly to the servo valve. Not only is it a compact system but it so positions the relatively delicate valve assembly that it is not readily subject to such damage as might be occasioned if, for example, the high-pressure nosewheel tire blew. Another salient advantage of my structure which will readily be apparent from an examination of FIGURE 3 is the ease of assembly of the parts making up my unit. These parts can readily be assembled from bottom to top of the housing 12 in an expeditious manner. I have thus done away with the necessity of assembling and bolting together a large number of various components.

For ease in exposition of the manner in which my system operates, I have shown in FIGURE 5 a schematic arrangement of the system in which I have indicated like parts to those in FIGURES 1 to 4 by the same reference characters. In FIGURE 5 I have indicated passage 106 as leading to a passage 154 connected to ports 86 and 88 of motor 70. I have shown passage 108 as connected to line 160 leading to inlet passages 90 and 92 of the motor. In the form of my system illustrated in FIGURES 2 to 5, the rotor 104 of the servo valve may be operated by any suitable means such, for example, as a cable or link drive from the cockpit which I have indicated schematically in FIGURE 5 by the reference character 162. I supply fluid under pressure from a supply line 164 through a normally closed valve 166 adapted to be opened by a solenoid 168 through a linkage 170. Any convenient control may be employed to close a switch 172 to connect solenoid 168 to a source of potential such as a battery 174 to open the valve 176 to supply fluid under pressure to the valve 114. By way of example, this can be done in response to operation of a pilot's stick switch in conjunction with limit switches on the landing gear and strut assemblies. Since that arrangement per se forms no part of my invention, it will not be described in detail.

The linkage 162 may be either manually operated or it may be operated in response to the rudder pedal. Assuming that no fluid under pressure is provided and that the valve rotor 104 is so located that it blocks the sleeve passages leading to lines 106 and 108, no fluid under pressure will be supplied to the motor 70. At the same time lines 154 and 160 leading to the respective pairs of motor inlet ports 86 and 88 and 90 and 92 are connected through the flow-restricting assembly 138.

To place the nosewheel steering system in operation, switch 172 is closed to open valve 166 to connect the fluid pressure line to the valve 114 to move the valve downwardly against the action of spring 118 thus to supply fluid under pressure to the line 120. These connections having been made, if linkage 162 is operated, for example, to rotate rotor 104 in a clockwise direction, fluid under pressure is supplied to line 108 through diametrically opposed ports in sleeve 100. At the same time line 106 is connected to the return passage 126. Under these conditions rotor 78 is driven in a clockwise direction to drive shaft 66 and, through the planetary system indicated schematically by the block 176 in FIGURE 5, the torque collar. The motion of the planetary gear system 176 is applied to the shaft 150 which is connected to the sleeve 100 to position the sleeve. It will be apparent that the sleeve 100 is driven in the same direction as that in which rotor 148 was moved so that ultimately the rotor ports will register with the port closing portions of the rotor to terminate the control operation. Movement of the rotor 104 in the reverse direction will produce movement of the wheel in the reverse direction in a manner analogous to that just described.

Referring now to FIGURES 6 and 7, I have shown an alternate form of my invention wherein I employ an electro-hydraulic feedback system rather than a purely hydraulic feedback. Since much of the unit of this form of my invention is the same as that described in connection with FIGURES 2 to 4, I will not describe the complete system. In this arrangement retainer ring 94 holds a closure plate 178 in the top of the housing 12. Shaft 66 has the same central bore 148 through which feedback shaft 150 extends. In this arrangement, however, rather than driving the sleeve of a servo valve, shaft 150 drives a gear 179 meshing with a gear 181 on the input shaft 180 of the feedback potentiometer indicated generally by the reference character 182. Moreover, in this form of my invention I employ a hydraulic preamplifier indicated generally by the reference character 184 rather than the rotary servo valve 102. Valve 184 includes a housing 186 having an inlet port 188 to which fluid under pressure can be supplied by any suitable means such as by the solenoid-operated valve 166 shown in FIGURE 4.

Valve 184 includes a spool having a shaft 190 with a land 192 adapted to block inlet port 188 in the neutral position thereof to which it is urged by respective springs 194 and 196 acting on lands 198 and 200 on the shaft 190. In that position of the spool land 198 blocks a first return port 202 while land 200 blocks a second return port 204. Respective outlet ports 206 and 208 leading to the space between lands 192 and 198 and to the space between land 200 and land 192 connect these spaces to lines or passages 106 and 108.

Feedback potentiometer 182 has a winding 210 adapted to be engaged by a brush 212 driven by shaft 150 from the planetary gearing 176 through gears 179 and 181. This form of my invention includes an input potentiometer indicated generally by the reference character 214 having a winding 216 engaged by a brush 218, positioned by a suitable linkage 220 in response to either a manual operation or to the operation of a rudder pedal. I connect windings 210 and 216 in parallel between a terminal 222 of a suitable source of potential and ground. I connect the respective brushes 212 and 218 to the input of a suitable control amplifier 224 which amplifies the signal difference between the brushes 212 and 218. A first diode 226 applies an amplified output signal of one polarity to the winding 228 of an electromagnet 230 adapted to act on an armature 232 carried by one end of the shaft 190. A diode 234 applies an output signal of the opposite polarity to the winding 236 of an electromagnet 238 adapted to act on an armature 240 carried by the other end of the shaft 190.

It will be seen that when a signal difference exists at the brushes 212 and 218, the amplifier output signal energizes one or the other of the windings 228 and 236 to displace shaft 190 to the left or to the right to connect one or the other of the lines 106 and 108 to the source of fluid under pressure and to connect the other of the lines to a return passage. Thus, fluid under pressure is supplied to the motor 70 to drive the torque collar in one direction or the other. Owing to the feedback provided by shaft 150, brush 212 is moved in such a direction as will reduce the error signal towards zero to terminate the control operation.

Figure 2:
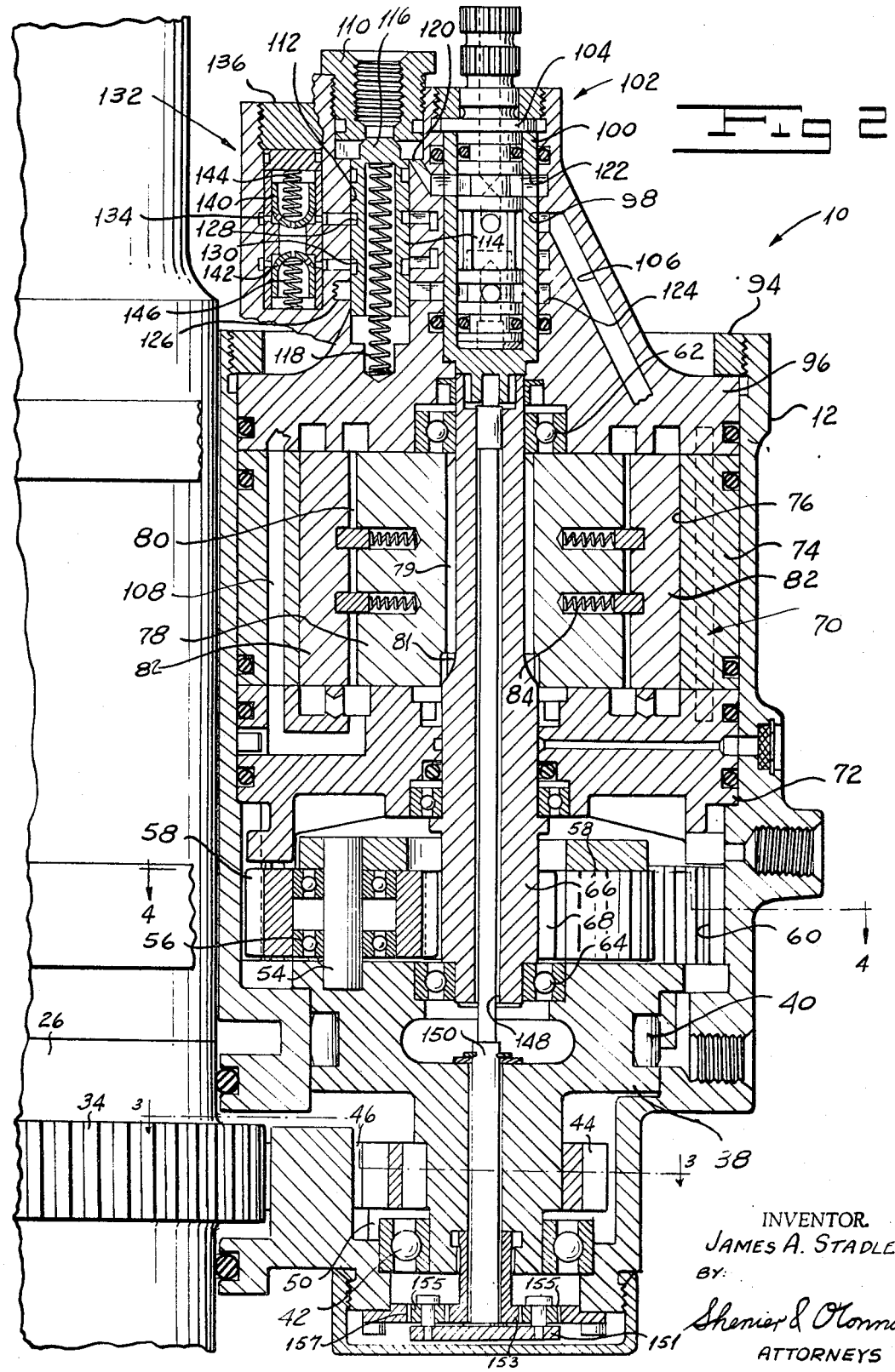
FIGURE 2 is a sectional view of one form of my improved hydromechanical power and control unit.
Figure 4:
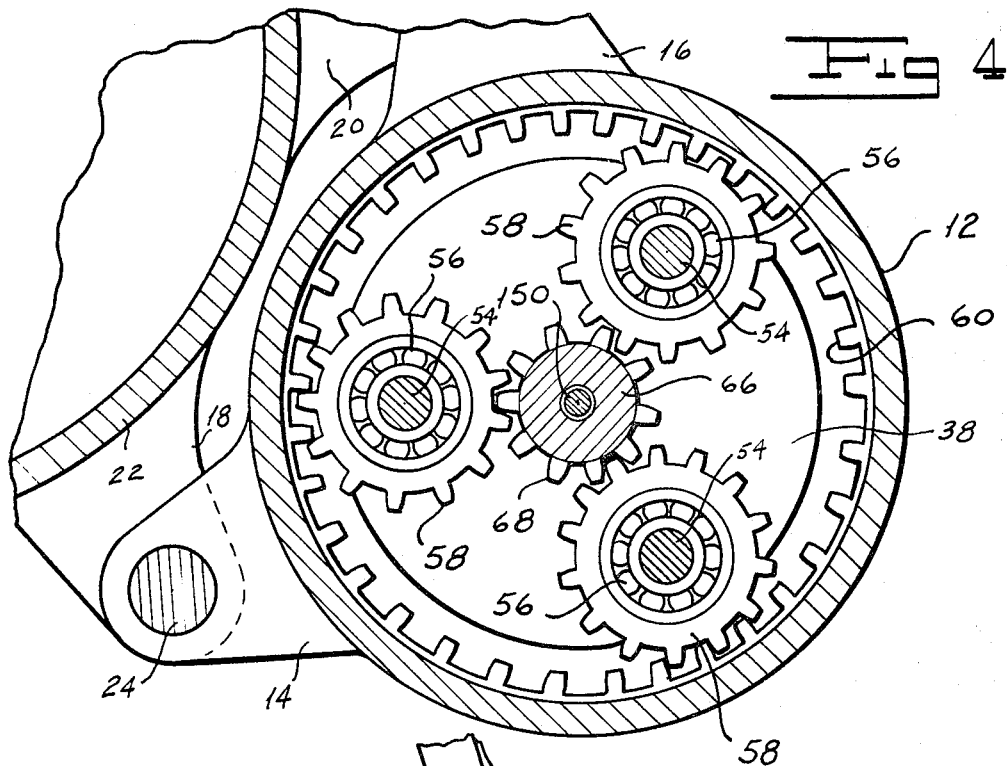
FIGURE 4 is a sectional view of my hydromechanical power and control unit taken along the line 4—4 of FIGURE 2.

Assembly of both the form of my power system shown in FIGURES 2 to 4 and the form shown in FIGURES 6 and 7 may be done in a rapid and expeditious manner. First, the gears, such as gears 46 and 48, are positioned in the base of the housing 12 and the planetary gear carrier 38 is mounted on the bearings 40 and 42 within the housing. When this has been done, the shaft 66 carrying the sun gear 68 is assembled in the housing and the spacer 72 is put in position. Next, the hydraulic motor 70 is assembled in position over the spacer 72. While I have shown the form of the system wherein I employ the gear 44 on the planetary gear carrier 38 for transmitting power to the ring gear 34 through gears 46 and 48, it will readily be appreciated that as an alternative I may provide a single gear on the carrier 38 which gear meshes directly with the ring gear 34 on torque collar 26.

When the assembly operations just described are complete, I mount the feedback unit on top of the vane motor 70. In the form of the device shown in FIGURES 2 to 4, I secure the valve body 96 carrying the respective valves in position by means of the retainer ring 94. In connection with the showing of FIGURE 2 it is to be noted that I have blown up that portion of the body 96 in which valve 114 and flow restricter 132 are disposed for purposes of clarity in exposition. In the form of my invention shown in FIGURE 6 I mount the assembly of the fluid amplifier 184 and the feedback potentiometer 182 on the body 12.

When the operations just described are complete the feedback shaft 150 is passed through the planetary gear carrier 138 and through the bore 148 into operative engagement with either the valve sleeve 100 or the potentiometer input shaft 180 through gearing 179 and 181. It is then secured to the carrier 38 for movement therewith.

From the assembly operation just described it will readily be appreciated that my device is constructed in such a manner as greatly to facilitate assembly and to avoid the necessity for bolting a plurality of different units together. Moreover, owing to the disposition of the feedback unit above the power unit, the former is not in a position at which it will be susceptible to damage upon the occurrence of an event such as a nosewheel tire blowout.

In operation of the form of my invention shown in FIGURES 2 to 5, the steering system is rendered operative by closing switch 172 to energize winding 168 to open valve 166 to supply fluid under pressure to the fitting 110 to move valve 114 downwardly against the action of spring 118 to admit fluid to the line 120. When this has been done in order to turn motor rotor 78 in a clockwise direction, for example, valve spool 104 may be rotated by means of the linkage 162 in a clockwise direction to admit fluid under pressure to the passage 108 which supplies the conduit 160 leading to inlet ports 90 and 92. At the same time passage 106 is connected to the exhaust line 126. With these connections the fluid under pressure acts on rotor 78 to displace the rotor in a clockwise direction. When that occurs shaft 66 turns in a clockwise direction to drive carrier 38 through the medium of the planetary gears 58 to turn torque collar 26 through gears 46 and 48. As the carrier 38 rotates it drives feedback shaft 150 through planetary gearing 153, 155 and 157 to move sleeve 100 in a clockwise direction until the flow of fluid to the passage 108 is cut off. At that point the commanded position has been reached.

The operation of the system in producing a counter-clockwise rotation is analogous to that described above in connection with the clockwise rotation. When the system is not in operation so that valve 166 is closed and valve 114 is moved upwardly until the head 116 seats on the fitting 110, the passages 154 and 160 are interconnected through the flow-restricting device 138 thus to damp any tendency of the wheel to shimmy.

In operation of the form of my invention shown in FIGURES 6 and 7, as in the form of my invention shown in FIGURES 2 to 5, valve 166 is opened to render the steering system operative. When that has been done the linkage 220 is actuated to position potentiometer brush 218 to produce a signal difference which is amplified by amplifier 224 and fed to the diodes 226 and 234. For one direction of commanded movement diode 226 passes the signal to winding 228 to displace shaft 190 to the left to connect passage 108 to the source of fluid under pressure and to connect passage 106 to the exhaust to produce a rotation of the planetary gear carrier 38 in the manner described in connection with FIGURES 2 to 5. The feedback shaft 150 is driven by the carrier 38 to move brush 212 to feedback potentiometer 182 in a direction to reduce the error signal to zero. For rotation in the other direction, brush 218 is moved in the other direction.

While I have described my system in connection with nosewheel steering in which application it has special utility, it also finds many other uses where its simplicity, ruggedness and compactness of construction are advantageous. For example, it can be used for actuating a cargo ramp, for operating a large antenna array and in other application where a large power output from a small input signal is desired.

It will be seen that I have accomplished the objects of my invention. I have provided an improved hydromechanical power and control system which is especially adapted for use in a nosewheel steering system. My unit is extremely simple in construction for the result achieved thereby. It is compact. The relatively delicate feedback elements are not easily damaged as a result of failure of components in the environment of my system.

It will be understood that certain features and subcombinations are of utility and may be employed without reference to other features and subcombinations. That is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a power system a prime mover having an output shaft, feedback means controlling said prime mover in response to movement of said output shaft, said feedback means having an input shaft, means mounting said prime mover and said feedback means with said output and input shafts in substantially coaxial relationship, and means including a gear system for connecting said input shaft to said output shaft.

2. In a power system a prime mover having an output shaft provided with an axially extending bore, a driven element adjacent one end of said shaft, means coupling said driven element to said shaft, feedback means controlling said prime mover in response to movement of said output shaft, said feedback means having a positionable element, means mounting said feedback means adjacent the other end of said output shaft, and a feedback shaft extending from said driven element through said bore to said positionable element.

3. In a power system a housing, a prime mover having an output shaft, feedback means controlling said prime mover in response to movement of said output shaft, said feedback means having an input shaft, means mounting said feedback means on said housing, means comprising a gear system disposed in said housing for coupling said output shaft to said input shaft, and means mounting said prime mover in said housing between said feedback means and said gear system.

4. In a power system a housing, a prime mover having an output shaft, a gear system comprising an input gear and an output gear in said housing, feedback means controlling said prime mover in response to movement of said output shaft, said feedback means mounting said feedback means on said housing, means connecting said input gear to said output shaft for movement therewith, means connecting said positionable element to said output gear for movement therewith and means mounting said prime mover in said housing between said gear system and said feedback means.

5. In a power system for an aircraft nosewheel assembly having a torque collar, a housing carried by said assembly, a prime mover having an output shaft, feedback means controlling said prime mover in response to movement of said output shaft, said feedback means having an input shaft, means mounting said feedback means on said housing, means including a first gear system in said housing for drivingly coupling said output shaft to said torque collar, means including a second gear system in said housing for connecting said output shaft to said input shaft and means mounting said prime mover in said housing between said feedback means and said coupling means.

6. In a power system for an aircraft nosewheel assembly having a torque collar, a prime mover having an output shaft, feedback means controlling said prime mover in response to movement of said output shaft, said feedback means having an input shaft, means mounting said feedback means with said input shaft in substantially coaxial relationship with said output shaft, means including a first gear system for drivingly connecting said output shaft to said torque collar, means including a second gear system for connecting said output shaft to said input shaft and means mounting said prime mover between said feedback means and said connecting means.

7. In a power system for a nosewheel steering assembly having a torque collar, a housing, a prime mover having an output shaft, a gear system in said housing, said gear system comprising a sun gear carried by said shaft, a ring gear carried by said housing, a planet gear carrier and a planet gear on said carrier in engagement with said ring and said sun gears, feedback means controlling said prime mover in response to movement of said output shaft, said feedback means having a positionable element, means mounting said feedback means on said housing, means connecting said carrier to said positionable element and means mounting said prime mover in said housing between said gear system and said feedback means.

8. In a power system for a nosewheel steering assembly having a torque collar, a housing, a prime mover having an output shaft formed with an axially extending bore, a gear system in said housing, said gear system comprising a sun gear carried by said shaft, a ring gear carried by said housing a planet gear carrier and a planet gear on said carrier in engagement with said ring and said sun gears, feedback means controlling said prime mover in response to movement of said output shaft, said feedback means having a positionable element, means mounting said feedback means on said housing, means mounting said prime mover in said housing between said gear system and said feedback means and a feedback shaft extending through said bore for connecting said carrier to said positionable element.

9. In a power system for a nosewheel steering assembly having a torque collar, a housing, a prime mover having an output shaft, a gear system in said housing, said gear system comprising a sun gear carried by said shaft, a ring gear carried by said housing, a planet gear carrier and a planet gear on said carrier in engagement with said ring and sun gears, feedback means controlling said prime mover in response to movement of said output shaft, said feedback means comprising a servo valve having a positionable sleeve, means mounting said feedback means on said housing, means mounting said prime mover in said housing between said gear system and said feedback means and means connecting said carrier to said positionable sleeve.

10. In a power system for a nosewheel steering assembly having a torque collar, a housing, a prime mover having an output shaft, a gear system in said housing, said gear system comprising a sun gear carried by said shaft, a ring gear carried by said housing, a planet gear carrier and a planet gear on said carrier in engagement with said ring and said sun gears, feedback means controlling said prime mover in response to movement of said output shaft, said feedback means comprising a potentiometer having a positionable shaft, means mounting said feedback means on said housing, means mounting said prime mover in said housing between said gear system and said feedback means and means connecting said carrier to said positionable shaft.

11. In a power system for a nosewheel steering assembly having a torque collar, a housing, a prime mover having an output shaft, a planetary gear system comprising a sun gear carried by said shaft, a ring gear carried by said housing, a planet gear carrier and a planet gear on said carrier in engagement with said ring and sun gears, an output gear on said carrier and a pair of gears circumferentially spaced with respect to said output gear for drivingly connecting said output gear to said torque collar, feedback means controlling said prime mover in response to movement of said output shaft, said feedback means having a positionable element, means mounting said feedback means on said housing, means mounting said prime mover in said housing between said planetary gear system and said feedback means and means connecting said carrier to said positionable element.

12. In a power system for a nosewheel steering assembly having a torque collar mounted for rotation around a first axis, a drive system comprising an output shaft mounted for movement around a second axis generally parallel to the first axis, a first gear on said shaft and a pair of gears circumferentially spaced with respect to said shaft and rotatable around axes generally parallel to said first and second axes for connecting said first gear to said torque collar.

References Cited
UNITED STATES PATENTS

| | | | |
|---|---|---|---|
| 2,554,590 | 5/1951 | Petersen | 244—50 X |
| 3,211,400 | 10/1965 | Booth | 244—50 |
| 2,243,603 | 5/1941 | MacMillin et al. | 91—375 |
| 2,349,641 | 5/1944 | Tucker et al. | 91—375 X |
| 2,369,324 | 2/1945 | Thompson | 91—375 |
| 2,372,710 | 4/1945 | Chisholm | 91—375 X |
| 2,383,773 | 8/1945 | Chisholm | 91—375 X |
| 2,503,447 | 4/1950 | May | 91—375 X |
| 3,007,655 | 11/1961 | Criswell et al. | 91—363 X |
| 3,185,439 | 5/1965 | Inaba et al. | 91—375 X |

FRED C. MATTERN, Jr., *Primary Examiner.*

DONLEY J. STOCKING, *Examiner.*

J. R. BENEFIEL, A. T. McKEON,
*Assistant Examiners.*

UNITED STATES PATENT OFFICE
CERTIFICATE OF CORRECTION

Patent No. 3,391,580                                July 9, 1968

James A. Stadler

It is certified that error appears in the above identified patent and that said Letters Patent are hereby corrected as shown below:

Column 7, line 67, after "feedback" insert -- means having a positionable element, --. Column 8, line 15, "feedbeck" should read -- feedback --; line 41, "housing" should read -- housing, --.

Signed and sealed this 18th day of November 1969.

(SEAL)
Attest:

Edward M. Fletcher, Jr.                        WILLIAM E. SCHUYLER, JR.
Attesting Officer                                Commissioner of Patents